US005792558A

United States Patent [19]

Jonas et al.

[11] Patent Number: 5,792,558

[45] Date of Patent: *Aug. 11, 1998

[54] PROCESS FOR THE ELECTROSTATIC LACQUERING OF NON-CONDUCTIVE SURFACES

[75] Inventors: Friedrich Jonas, Aachen; Udo Guntermann, Krefeld; Klaus Lerch, Krefeld; Arthur Böhnke, Krefeld; Hans Basten, Krefeld; Peter Thometzek, Krefeld, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 721,141

[22] Filed: Sep. 26, 1996

[30] Foreign Application Priority Data

Oct. 2, 1995 [DE] Germany ........................ 195 36 844.4

[51] Int. Cl.$^6$ .............................. B05D 1/04; B05D 1/36; B32B 27/06; B32B 27/28

[52] U.S. Cl. .................. 428/419; 427/412.1; 427/412.4; 427/412.5; 427/470; 427/483; 427/485; 427/407.1; 428/412; 428/423.1; 428/423.5; 428/423.7

[58] Field of Search ................................ 427/412, 412.3, 427/412.5, 412.4, 421, 483, 484, 485, 470, 322, 407.1; 428/412, 419, 423.1, 473.5, 473.4, 423.5, 423.7, 480

[56] References Cited

U.S. PATENT DOCUMENTS

| | | | |
|---|---|---|---|
| 3,578,484 | 5/1971 | Walles et al. . | |
| 4,530,778 | 7/1985 | Nelson et al. | 427/397 |
| 4,686,108 | 8/1987 | Nason et al. | 427/408 |
| 4,992,559 | 2/1991 | Kathirgamanathan et al. | 549/65 |
| 5,035,926 | 7/1991 | Jonas et al. | 525/186 |
| 5,198,266 | 3/1993 | Witucki et al. | 427/407.1 |
| 5,300,575 | 4/1994 | Jonas et al. | 427/393.1 |
| 5,379,981 | 1/1995 | Krafft et al. | 430/529 |
| 5,400,460 | 3/1995 | Roeker et al. | 156/273.7 |
| 5,415,762 | 5/1995 | Allardyce et al. | 205/166 |
| 5,443,944 | 8/1995 | Krafft et al. | 430/496 |
| 5,478,616 | 12/1995 | Kochem et al. | 428/35.2 |
| 5,620,800 | 4/1997 | De Leeuw et al. | 427/305 |

FOREIGN PATENT DOCUMENTS

| | | |
|---|---|---|
| 339340 | 4/1989 | European Pat. Off. . |
| 440 957 | 12/1990 | European Pat. Off. . |
| 443767 | 8/1991 | European Pat. Off. . |
| 589 529 | 9/1993 | European Pat. Off. . |
| 576031 | 12/1993 | European Pat. Off. . |
| 42 11 459 | 10/1993 | Germany . |

OTHER PUBLICATIONS

Patent Abstracts of Japan, vol. 14, Jul. 16, 90, JP-A-02 120373..

*Primary Examiner*—Diana Dudash
*Attorney, Agent, or Firm*—Connolly and Hutz

[57] ABSTRACT

The invention relates to a process for the electrostatic lacquering of non-conductive surfaces. For this purpose, a layer of a conductive organic polymer from the class of the polypyrroles, polyanilines or polythiophenes is applied to the surface and this layer is then electrostatically lacquered.

12 Claims, No Drawings

PROCESS FOR THE ELECTROSTATIC LACQUERING OF NON-CONDUCTIVE SURFACES

In the last few decades, electrostatic low-solvent and/or solventless lacquering processes have increasingly gained in importance for environmental reasons. Powder lacquering is an example of solventless lacquering. In this case thermoplastic or crosslinking polymer powders are applied to the surfaces to be lacquered and are then sintered together and/or fused by heating with the formation of the lacquer film.

In the case of conductive materials such as metals the polymer powders and/or lacquers are preferably applied by means of electrostatic lacquering. The charging of the powder lacquer particles which is required for electrostatic lacquering can take place by direct contact of the particles with high-voltage electrodes. A further possibility is the application of charges by friction which makes use of the triboelectric behaviour.

For electrostatic lacquering, the surface of the body to be lacquered must be conductive. As plastics are usually insulators, they must be made electrically conductive before they can be electrostatically lacquered. Conductive fillers such as carbon blacks or metal oxides can be added to the plastics for this purpose. The disadvantage of this is that in the case of carbon blacks the moulded parts are then black and/or in the case of metal oxides, very high degrees of filling are required, which lead to poor mechanical properties.

A further possibility of rendering the plastics surfaces conductive comprises coating with conductive lacquers. If carbon black-filled conductivity lacquers are used, the surfaces are again black in colour, so that transparent and/or light coatings are difficult to produce.

It has now been found that organic, electrically conductive polymers are very suitable as conductive coating for plastics which are to be electrostatically lacquered.

The invention provides therefore a process for the electrostatic lacquering of nonconductive surfaces, characterized in that the non-conductive surfaces are coated with an electrically conductive organic polymer prior to lacquering.

Examples of suitable organic polymers are polyaniline, polystyrene and polythiophene and/or their derivatives. Different processes can be used to produce the conductive coating on the non-conductive surface. Examples of suitable processes are as follows:

1. Producing conductive polymers in situ on the non-conductive surface, as is described in EP-A 339 340 using the example of the polymerization of 3,4-ethylenedioxythiophene.
2. Coating the non-conductive surfaces with lacquers which contain the conductive polymers in finely dispersed and/or colloidal or dissolved form. Examples of suitable coating solutions are polyaniline dispersions in solvents such as toluene, xylene or methylisobutylketone (e.g. Incoblend-Lack® and/or Versicon®) or latices charged with polypyrrole, as are described in EP-A 589 529. Polythiophene derivatives such as are described in EP-A 440 957 and DE-OS 4 211 459 are preferred.

The aqueous polythiophene dispersions and/or solutions which are described in these patent applications and derive from 3,4-ethylenedioxythiophene as monomer and additionally contain polyanions derived from polymeric carboxylic or sulfonic acids are particularly preferred. Virtually colourless, transparent conductive coatings which do not have the disadvantages of black-coloured, carbon black-filled coatings can be produced with these solutions.

Examples of plastics which can be lacquered according to the process according to the invention are polyamides, polysulphones, polycarbonates, polyimides, polyesters, ABS, polystyrene, polyacrylates, polyvinyl chloride and their blends and copolymers, and also duromers such as those made of phenolic resins, epoxy resins, epoxydiisocyanurate resins.

The plastics can also contain conventional fillers such as inorganic minerals, e.g. kaolin or glass fibres. Non-conductive surfaces made of wood, such as pressboard panels, glass, ceramics of aluminium oxide, silicon nitride, porcelain, for example, can also be lacquered according to the process according to the invention.

The electrically conductive polymer dispersions and/or solutions can be used alone or in combination with binders. Examples of suitable binders are polyurethanes, polyvinyl acetate, polyacrylates, unsaturated polyester resins and/or their mixtures.

The binders are preferably used as aqueous dispersion or emulsion or solution.

The conductive coating is applied in a quantity which leads to surface resistances $<10^{10}\Omega$/square and permits a good electrostatic lacquering.

Generally speaking layer thicknesses of 0.05 to 50 μm, preferably 0.1 to 5 μm, are required for this.

Application takes place according to known technologies, such as by means of spraying, dipping, brushing, printing.

The coatings are dried after application. Drying takes place at room temperature or at higher temperatures up to 250° C., preferably 200° C.

Auxiliary solvents such as lower alcohols, e.g. methanol, ethanol, isopropanol or ketones, e.g. acetone or open-chain or cyclic amides e.g. N-methylpyrrolidone can be added to the aqueous dispersions of conductive polymer and optionally binders.

Examples of further additives are surfactants such as salts of long-chain aliphatic or araliphatic sulphonic acids.

Adhesion promoters such as organic silanes, e.g. 3-glycidoxypropyltrimethoxysilane can also be added to improve adhesion.

The coated surfaces are then electrostatically lacquered in per se known manner.

Preferably the plastics are powder-lacquered. Examples of suitable powder lacquer systems are epoxy resin powder lacquers, polyacrylate powder lacquers, hydroxylfunctional polyesters, which are crosslinked with carboxylic anhydrides, carboxylic acids or polyisocyanates, carboxylfunctional polyesters which are crosslinked with polyfunctional epoxides, e.g. trisglycidylisocyanurate.

After the powder lacquer coating has been applied it is sintered together and/or fused at elevated temperature. The temperature is 50° C. to 300° C., preferably 100° C. to 250° C. It is a great advantage of the process according to the invention that combinations of metals and plastics can now be jointly lacquered in one working step by means of electrostatic lacquering, whereas in the past the non-conductive plastics parts first had to be lacquered separately according to other processes and could only then be combined with the electrostatically lacquered metal parts.

EXAMPLES

Example 1

A round plastics plate of glass-fibre-filled polyamide 6.6 (30 wt. % of glass) (6 cm dia., 3 mm thick) was coated with the following solution on a lacquering centrifuge at 500 rpm:

10.0 g of 3,4-polyethylenedioxythiophene/polystyrene sulphonate solution, 1.3% in water (AI 4071, Bayer AG)

0.6 g of N-methylpyrrolidone 0.2 g of 3-glycidoxypropyltrimethoxysilane 12.5 g of isopropanol 2.5 g of water After coating the layer was dried with warm air at 50° C. After drying, a layer of approximately 1.0 μm thickness was obtained.

The plate coated in this way has a surface resistance of 3 kΩ/square. The plate was electrostatically sprayed with a powder lacquer based on trisglycidylisocyanurate (Araldit® TT 810, Ciba-Geigy AG) and polyester containing carboxyl groups (Uralac® 4200, DSM N.V.), which contained 50% titanium dioxide related to binder. The lacquer powder uniformly and completely covered the coating according to the invention. The powder lacquer was then stoved in an air-circulating oven for 10 minutes at 180° C.

After cooling, a high-gloss lacquer coating which adhered well to the plastic, was obtained (grid cut 0).

Equally good results were obtained on glass-fibre-filled polyamide 6 (30 wt. % of glass), polysulphone (UDEL® 1700, manufactured by Amoco Inc.), glass and aluminium oxide ceramics.

Comparative Experiment

A glass plate and a polycarbonate plate with no coating according to the invention were electrostatically sprayed with powder lacquer. The lacquer powder covered the plate in only few spots.

Example 2

Plastic and glass plates were coated with the following recipes on a lacquer centrifuge as in Example 1:

Recipe a)

4.20 g of 3,4-polyethylenedioxythiophene/polystyrene sulphonate solution, 1.3% in water (Al 4071, Bayer AG)

0.5 g of N-methylpyrrolidone 1.8 g of polyacrylate dispersion (Mowlith DM 771, Hoechst AG), solids content 50%

4.0 g of isopropanol 2.0 g of water

After drying, a layer of 0.8 μm thickness showing a surface resistance of $2.5\times10^6\Omega$/square was obtained.

Recipe b)

8.3 g of 3,4-polyethylenedioxythiophene/polystyrene sulphonate solution, 1.3% in water (Al 4071, Bayer AG)

0.5 g of N-methylpyrrolidone 1.6 g of polyvinyl acetate dispersion (Mowlith® DC, Hoechst AG), solids content 56%

2.0 g of isopropanol

After drying, a layer of 0.2 μm thickness showing a surface resistance of $4\times10^7\Omega$/square was obtained.

Recipe c)

6.0 g of 3,4-polyethylenedioxythiophene/polystyrene sulphonate solution, 1.3% in water (AI 4071, Bayer AG)

0.2 g of N-methylpyrrolidone 1.8 g of polyurethane dispersion (Bayhydrol® LS 2953, Bayer AG), solids content 40%

0.2 g of 3-glycidoxypropyltrimethoxysilane 0.6 g of isopropanol

After drying, a layer of 0.8 μm thickness showing a surface resistance of $2\times10^7\Omega$/square was obtained.

After the coating had been dried, as in Example 1 the plates were sprayed with powder lacquer and the lacquer then stoved. Uniform, well adhering, high-gloss lacquer coatings were obtained in all cases.

We claim:

1. A process for coating a substrate, consisting of:

a) providing a substrate having a non-conductive surface;

b) applying to said non-conductive surface a preparation comprising polythiophene and a polyanion derived from a polymeric sulfonic acid to form an conductive layer on said surface; and c) electrostatically spraying onto said conductive layer a lacquer topcoat.

2. The process of claim 1, wherein an aqueous dispersion of 3,4-poly(ethylenedioxythiophene) and polystyrene sulfonate is applied as the conductive layer.

3. The process of claim 2, wherein the aqueous dispersion of 3,4-poly(ethylenedioxythiophene) and polystyrene sulfonate additionally contains organic or inorganic binders.

4. A coated article prepared by the process of claim 2.

5. A coated article prepared by the process of claim 3.

6. A coated article prepared by the process of claim 1.

7. A process for coating a substrate, comprising:

a) providing a substrate having a non-conductive surface;

b) applying to said non-conductive surface a preparation comprising polythiophene and a polyanion derived from a polymeric sulfonic acid to form a conductive layer on said surface, without neutralization of acid groups in the preparation; and c) electrostatically spraying onto said conductive layer a lacquer topcoat.

8. The process of claim 7, wherein the preparation is an aqueous dispersion of 3,4-poly(ethylene-dioxythiophene) and polystyrene sulfonate.

9. The process of claim 8, wherein the aqueous dispersion additionally contains organic or inorganic binders.

10. A coated article prepared by the process of claim 7.

11. A coated article prepared by the process of claim 8.

12. A coated article prepared by the process of claim 9.

* * * * *